(12) United States Patent
Horst

(10) Patent No.: US 6,466,847 B1
(45) Date of Patent: Oct. 15, 2002

(54) REMOTE CONTROL SYSTEM FOR A LOCOMOTIVE USING VOICE COMMANDS

(76) Inventor: Folkert Horst, 4294 Graham Drive, Pierrefonds, Quebec (CA), H9H 2B6

(*) Notice: Subject to any disclaimer, the term of this patent is extended or adjusted under 35 U.S.C. 154(b) by 0 days.

(21) Appl. No.: 09/653,651

(22) Filed: Sep. 1, 2000

(51) Int. Cl.[7] .............................. G06F 7/00; G06F 19/00
(52) U.S. Cl. .............................. 701/29; 701/19; 701/20; 246/187 A; 246/187 C; 340/825.72
(58) Field of Search .............................. 701/19, 20, 29; 704/275; 246/187 A, 187 C; 340/825.69, 825.72

(56) References Cited

U.S. PATENT DOCUMENTS

| | | |
|---|---|---|
| 4,641,292 A | 2/1987 | Tunnell et al. |
| 4,725,956 A | 2/1988 | Jenkins |
| 5,511,749 A | 4/1996 | Horst et al. |
| 5,685,507 A | 11/1997 | Horst et al. |
| 5,832,440 A * | 11/1998 | Woodbridge et al. ........ 704/275 |

FOREIGN PATENT DOCUMENTS

| | | |
|---|---|---|
| DE | 197 43 306 A1 | 4/1999 |
| EP | 0 971 330 A1 | 2/2000 |
| JP | 60059901 | 4/1985 |
| WO | WO 99/05015 | 2/1999 |

* cited by examiner

*Primary Examiner*—Gertrude Arthur
(74) *Attorney, Agent, or Firm*—Merchant & Gould P.C.

(57) ABSTRACT

A remote control system for a locomotive. The remote control system includes a lead controller and follower controller connected to one another over a wireless communication link. The lead controller issues command over the wireless communication link and those commands are implemented by the follower controller mounted on-board the locomotive. The lead controller is responsive to voice commands uttered by the operator.

35 Claims, 3 Drawing Sheets

US 6,466,847 B1

REMOTE CONTROL SYSTEM FOR A LOCOMOTIVE USING VOICE COMMANDS

FIELD OF THE INVENTION

The present invention relates to components of a system for remotely controlling a locomotive. More particularly, the system is characterized by the ability to accept voice commands from a human operator.

BACKGROUND OF THE INVENTION

Systems for remotely controlling a locomotive are known in the art. For a reference, the reader is directed to the U.S. Pat. Nos. 5,511,749 and 5,685,507 that have been granted to Canac International Inc. on Apr. 30, 1996 and Nov. 11, 1997. Broadly stated, a remote control system for a locomotive has two main components, namely a lead controller and a follower controller. The follower controller is placed in the locomotive and it receives commands sent by the lead controller over a wireless communication link. The lead controller is in the form of a box or module that can be carried by a human operator located at a certain distance from the locomotive or the train pulled or pushed by the locomotive. When the operator would like to move the locomotive in a certain direction, he or she manipulates controls on the lead controllers to dial in the desired parameters such as direction of movement, speed, etc. The command is encoded and sent by the lead controller over the wireless communication link to the follower controller. The follower controller processes the command and generates local control signals that are applied to the locomotive to implement the command.

The human operator that controls the locomotive remotely should at all times follow visually the movement of the locomotive such as to stop the locomotive if a hazardous condition suddenly develops.

Currently existing remote control systems for a locomotive use lead controllers that have manually operated controls. Stated otherwise, the operator must press switches, buttons or turn dials in order to enter the desired command. During the time necessary to operate the controls on the lead controller, the operator cannot visually maintain contact with the moving locomotive. For the reasons mentioned earlier, this constitutes a disadvantage. In addition, the hands of the operator are kept busy which prevents him from performing other useful tasks.

Against this background, it appears that there exists a need in the industry to develop a remote control system for a locomotive that limits or reduces the amount of time during which an operation must break visual contact with the moving locomotive in order to enter a command on the lead controller as well as allow greater flexibility in manual operations.

SUMMARY OF THE INVENTION

Under a first board aspect, the invention provides a lead controller for use with a remote control system for a locomotive. The lead controller comprises an input, a processing unit coupled to the input and a communication link interface. The input is designed for receiving a signal derived from a spoken utterance. The signal is processed by the processing unit that generates data indicative of a command to be executed by the locomotive. The communication link interface is operative for transmitting the data indicative of the command to be executed by the locomotive to a follower controller in the locomotive where the command can be implemented.

Under a specific non-limiting example of implementation, the processing unit includes a speech recognition engine that attempts to match the spoken utterance to a vocabulary item in a speech recognition dictionary. The vocabulary item found to be the best match is then passed to a text-to-speech converter that synthesizes and audibly plays to the operator the vocabulary item found to match the spoken utterance. If the operator confirms that the speech recognition engine has issued the correct result (the spoken utterance has been correctly interpreted by the speech recognition engine) the command is implemented. Otherwise, no action is taken.

The advantage of this example of implementation over prior art designs is that the operator can supply commands to the lead controller by using voice and there is little or no necessity for him or her to break visual contact with the moving locomotive.

Another advantage is that the use of speech allows the hands of the operator be freed such as to allow him/her to perform other useful tasks.

In a second broad aspect, the invention provides a remote control system for a locomotive that has a lead controller remote from the locomotive and a follower controller that is designed to be mounted in the locomotive. The lead controller and the follower controller establish a wireless communication link between them. The lead controller includes an input for receiving a signal derived from a spoken utterance and, in response to this signal, derives from the spoken utterance data indicative of a command to be executed by the locomotive. The lead controller includes a communication link interface operative for transmitting the data indicative a command to be executed by the locomotive over the wireless communication link to the follower controller. The follower controller is responsible to the data indicative of a command to be executed by the locomotive for generating local signals for application to the locomotive to cause the locomotive to execute the command.

BRIEF DESCRIPTION OF THE DRAWINGS

A detailed description of examples of implementation of the present invention is provided hereinbelow with reference to the following drawings, in which.

Figure 1:
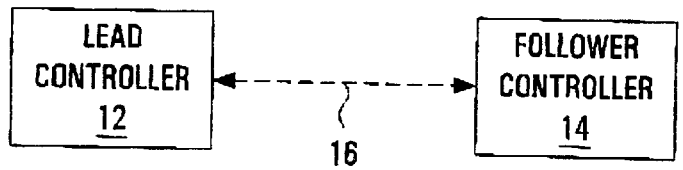
FIG. 1 is a block diagram of a remote control system for a locomotive.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

A non-limiting example of implementation of the present invention is illustrated in FIG. 1 of the drawings. In particular, FIG. 1 illustrates a remote control system for a locomotive. The remote control system includes two main components, namely a lead controller 12 and a follower controller 14 that are linked to one another by a wireless communication link 16.

In use, an operator dials-in commands at the lead controller 12 and those commands are relayed to the follower controller mounted on-board the locomotive. The follower controller will process the commands and issue local signals that are applied to the locomotive such as to implement the commands specified by the operator.

Figure 2:
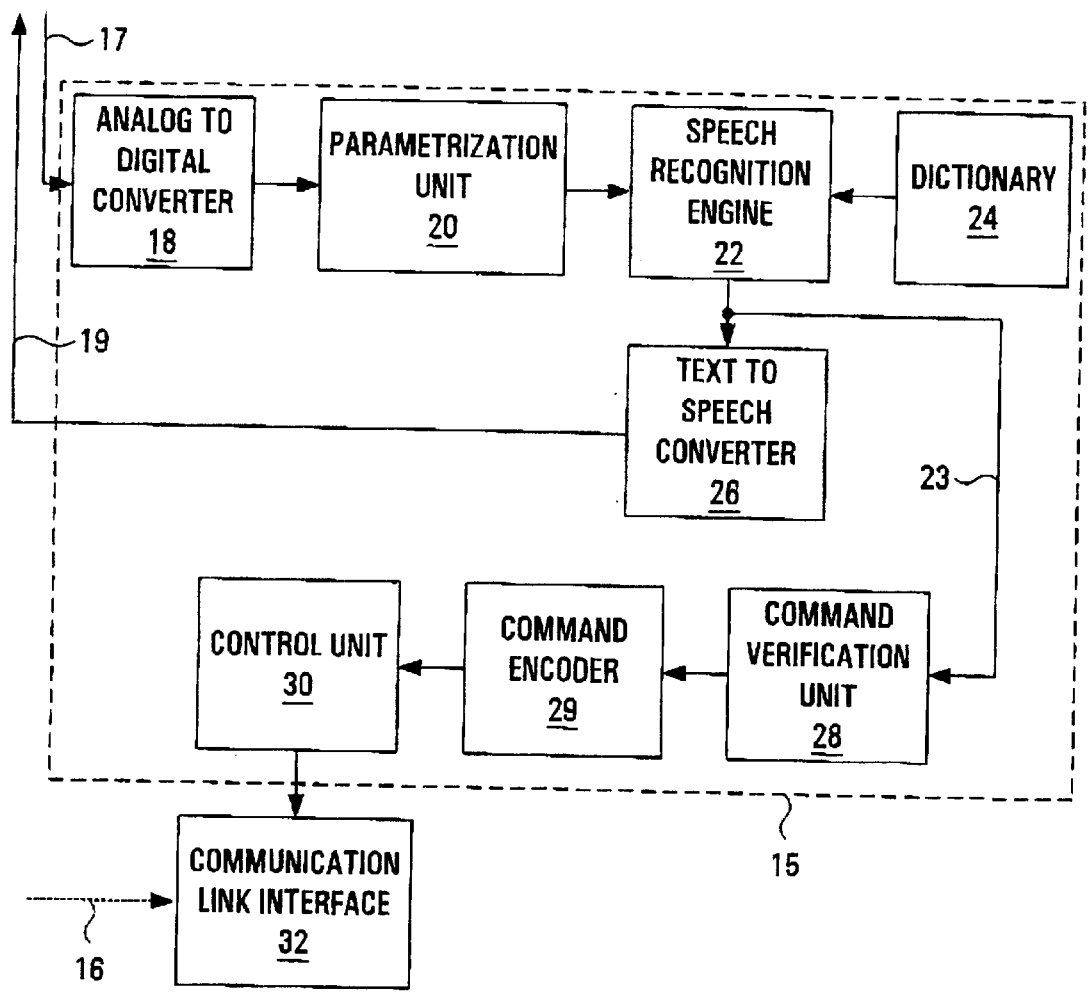
FIG. 2 is a block diagram of a lead controller of the remote control system for a locomotive depicted in FIG. 1.

A detailed block diagram of the lead controller 12 is shown in FIG. 2. The lead controller includes two main components, namely a processing unit 15 and a communication link interface 32. The processing unit 15 has an input that receives vocal commands from the operator. In practice the input 17 is the output from a microphone. The signal at the input 17 is of analog nature. That signal is applied to an analog-to-digital converter 18 that digitizes the signal according to a Pulse Code Modulation (PCM) technique or according to any other suitable method. The stream of PCM samples released from the analog-to-digital converter 18 are applied to a parameterization unit 20 whose task is to extract from the audio signal containing the speech information significant features on which further speech processing can be performed.

Examples of speech feature elements include feature vectors, spectral parameters, audio signal segments, band energies and cepstral parameters, among others.

It is not deemed necessary to described in detail the structure and operation of the parameterization unit 20 since such component is well known to those skilled in the art.

The feature elements extracted by the parameterization unit 20 are passed to a speech recognition engine 22. Any suitable commercially available speech recognition engine can be used without departing from the spirit of the invention. The speech recognition engine 22 works in conjunction with a speech recognition dictionary 24 that contains a list of vocabulary items that the speech recognition engine 22 can recognize. In use, when the speech recognition engine 22 receives the feature elements generated by the parameterization unit 20, it generates at output 23 data that represents the vocabulary item best matching the spoken utterance characterized by the feature elements.

The vocabulary items held in the speech recognition dictionary 24 reflect the commands that the lead controller 12 should be able to recognize.

For better recognition performance, the speech recognition engine 22 is speaker dependent. In other words, the speech recognition engine 22 should be trained from speech tokens from a specific speaker such that the speech recognition engine better adapts to the characteristics of the speaker. Alternatively, a speaker independent speech recognition engine can be used without departing from the spirit of the invention.

The recognition results are released by the speech recognition engine 22 on the output 23. In one specific example, the recognition results are the vocabulary item found as being the best match to the spoken utterance, expressed in orthographic form. Other types of representations of the recognition results can be used without departing from the spirit of the invention.

The recognition results are input in a text to speech converter 26 that synthesizes an audio signal released on the output 19 to audibly play to the user the recognition result. This mechanism is provided as a safety feature to allow the operator to abort a command in cases when the recognition results are incorrect. In a specific non-limiting example of implementation, the audio signal released from the text-to-speech converter is in analog form. The analog signal is then passed to a suitable amplifier (not shown in the drawings) and a suitable speaker (not shown in the drawings) such as to audibly play the synthetic speech to the operator.

Any suitable text-to-speech converter could be used without departing from the spirit of the invention. In light of the fact that text-to-speech converters are generally known in the art it is not deemed necessary to describe them here in detail.

The output 23 is also applied to a command verification unit 28. The command verification unit gates the recognition results. If a confirmation has been received from the operator within a specified time period that the recognition result in accurate, the command verification unit 28 will release the recognition result for further processing. If no positive input has been received from the operator within the specified time period or a negative input has been received from the operator the command verification unit 28 deletes or otherwise negates the recognition results applied at its input.

In one specific example, the command verification unit 28 will release the recognition results only if the operator has uttered the word "yes" within a contain time frame after reception of the recognition results, say 5 seconds. After the recognition results are input in the command verification unit 28, a timer starts. At the same time, the operator receives from the test-to-speech converter 26 synthesized speech conveying what are the recognition results. If the operator accepts the results, he utters "yes". The new spoken utterance is processed as described previously, and assuming a correct recognition the orthographic representation of the work "yes" appears at the output 23 and it is supplied to the command verification unit 28. If the word "yes" is received before the expiration of the 5 seconds interval, the prior recognition results (conveying the original command) are released by the command verification unit 28. If nothing is received by the command verification unit 28 before the timer stops, then the prior recognition results buffered in the command verification unit 28 are deleted. The same operation is performed if any other word than "yes" is received by the command verification unit 28.

In the example of implementation shown in FIG. 2, the architecture of the system is such that the operator will also hear the recognition results from the confirmation utterance, namely the word "yes" (assuming correct recognition). In some applications, this might be desirable. If this feature is not desirable, the system shown in FIG. 2 can be modified such that a control signal is issued from the command verification unit 28 while the time is counting. The control signal is applied to the text-to-speech converter 26 such as to prevent the converter from operating. After the timer stops, the control signal is no longer generated and the text-to-speech converter 26 is re-activated.

In a possible variant, a confirmation other than a vocal confirmation can be used. For instance, the lead controller 12 can be provided with a button that that operator needs to depress in order to confirm the recognition results. This possibility can be implemented by modifying the command verification unit 28 to release the recognition results when a logic signal derived from the manual actuation of the button is received before the timer stops.

In another possible variant, the command verification unit 28 will include a speaker verification module allowing to verify that the operator entering the voice command is an authorized user. Prior to using the system, each authorized user will be asked to provide a respective access voice print associated to a user identification number. A voice point is a mathematical representation the acoustic properties of a spoken utterance. The access voice print will be used to grant access to the control system by performing a similarity measurement between the access voice print and an input utterance provided by the operator. For increased security, in addition to the identification number and access voice print, a speaker verification operation will be performed for each command received from an operator. In this case, command voice prints for each allowable command will have to be provided by each authorized user prior to using the control system. These command voice prints are stored in records in a computer readable medium and are associated to respective authorized user via their identification number. Once an operator has been granted access to the control system by his access voice print, the corresponding record containing the command voice prints is extracted and used for subsequent speaker verification operations. Consequently, each spoken utterance indicative of a command received by the control system is verified against the corresponding command voice print in the record associated to the given user. Speaker verification units are well-known and will not be further described here. If the operator cannot be verified as an authorized user, the system will issue a message indicating that control access is being denied.

When the recognition results are released from the command verification unit 28, they are passed to a command translator. The purpose of the command translator is to encode the command in a format suitable for processing by the control unit 30 to be described later. Generally stated, the command released by the command validation unit is in orthographic form which is not the best form suited for analysis such as basic sanity checks and other similar operations to be performed by the control unit 30.

In a prior art lead controller, when the operator manually acts on the controls, the commands are encoded and supplied to a control unit. In the present example of implementation, the command translator will convert the command that is orthographic representation to a format normally obtained from typical manually operated controls. This feature allows using a control unit 30 of known design since the control unit 30 will receive commands in a format that it can already interpret.

The command translator 29 can be designed around a database that maps the orthographic representation of a command to its encoded form. The size of the database will depend upon the number of possible commands the lead controller 12 is designed to vocally accept.

The controller unit 30 receives the encoded command and processes it. One type of processing is to perform a high-level validation or sanity check. For example, when the locomotive is travelling forward and a command is received that specifies a reverse movement, that command is rejected. In general, the control unit 30 is of known construction and it does not need to be described in detail here. For more information, the reader is directed to the U.S. Pat. Nos. 5,511,749 and 5,685,507 that provide more information on this particular point.

Figure 3:
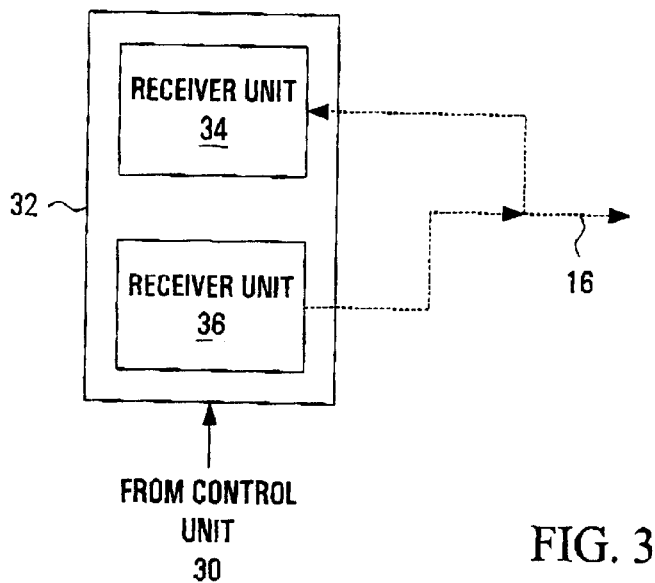
FIG. 3 is a block diagram of a communication link interface of the lead controller shown in FIG. 2.

The output generated by the control unit 30 is passed to the communication link interface 32 such that it can be transmitted to the follower controller 14 over the wireless communication link 16. An example of implementation of the communication link interface is shown in FIG. 3. The communication link interface includes a receiver unit 34 and a transmitter unit 36. Signals issued from the control unit 30 are passed to the transmitter unit 36 for modulation and any other suitable processing such as they can be transported over the wireless communication link. Similarly, signals in the wireless communication link 16 directed at the lead controller 12 are passed to the receiver unit 34 for demodulation and they are then passed to the component of the lead control 12 designed to process them.

Figure 4:
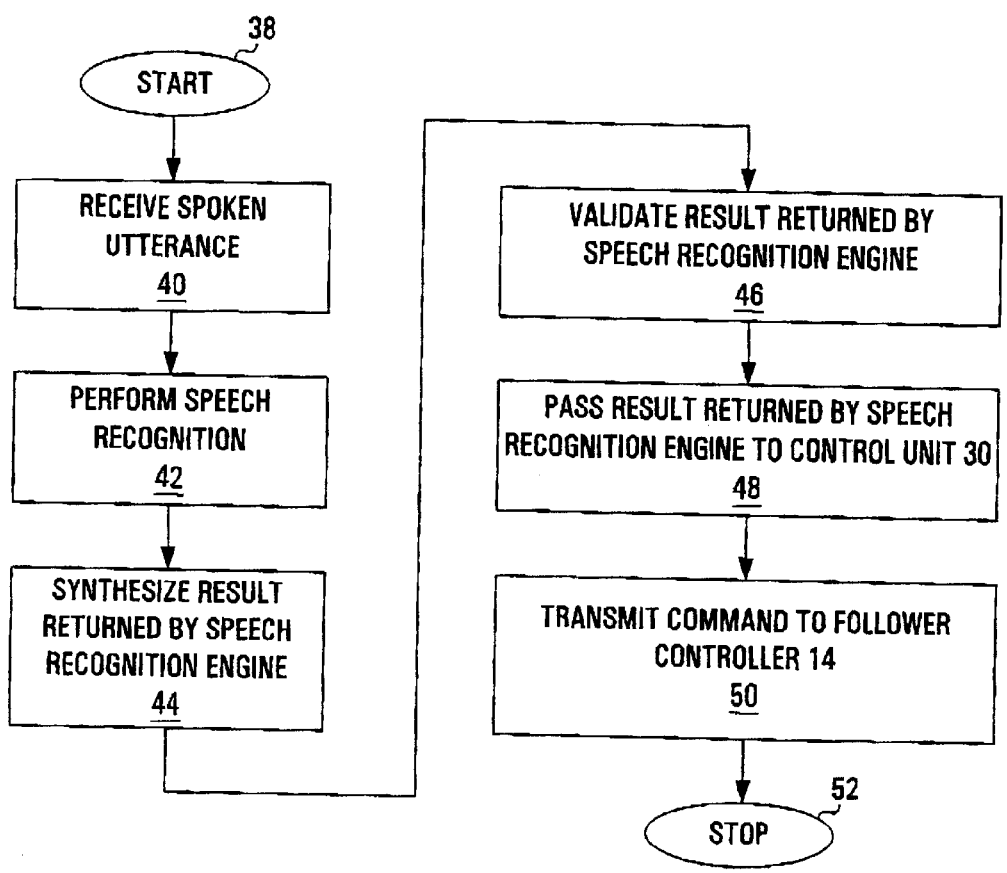
FIG. 4 is a flow-chart illustrating the operation of the lead controller shown in FIG. 2.

FIG. 4 is a flowchart that summarizes the operation of the lead controller 12. At the block 38, the process starts. At step 40, the vocal command uttered by the operator is received at the input 17. At step 42, the spoken utterance is recognized. At step 44, synthetic speech is created and played to the operator to communicated to him the recognition results. At step 46, the recognition results are validated. At step 48, the validated recognition results are passed to the command translator 29 for encoding and then to the control unit 30. At step 50, the command is sent to the follower controller 14 over the wireless communication link 16.

Figure 5:
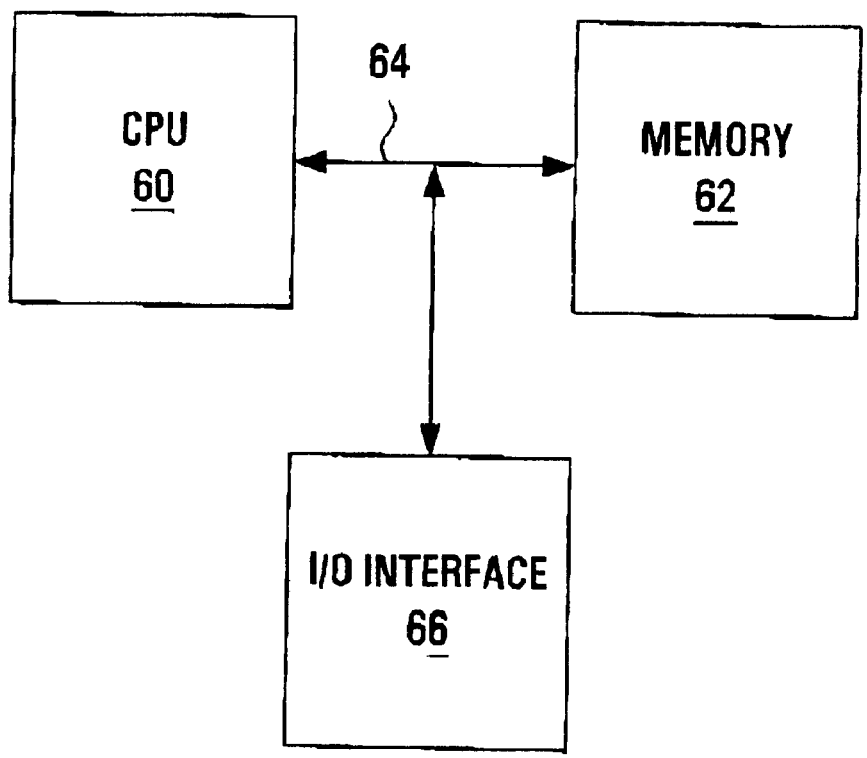
FIG. 5 is a block diagram of a computing platform that can be used to implement some of the components of the remote control system for a locomotive shown in FIG. 1.

The processing unit 15 can in large part be implemented in software executed on a suitable computing platform of the type illustrated in FIG. 5. Such computing platform includes a Central Processing Unit (CPU) 60 connected to a memory 67 over a data bus 64. An Input/Output interface 66 is connected to the data bus 64 and allows the computing platform to exchange signals/data with the external world. The memory 62 is used for holding program instructions of program elements that implement the functionality of components of the processing unit 15. Also, the memory 62 is used to hold data on which the program elements operate.

The structure and operation of the follower controller 14 is not described in this specification. For more information the reader is directed to the U.S. Pat. Nos. 5,511,749 and 5,685,507.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A lead controller for a locomotive, comprising:
   a) an input for receiving:
      i) a first signal derived from a spoken utterance; and
      ii) a second indicative of a validation data element;
   b) a processing unit coupled to said input, said processing unit being operative to:
      i) process the first signal to derive data indicative of at least one vocabulary item that is a potential match to the spoken utterance;
      ii) generate a control signal indicative of a command to be executed by the locomotive at least in part on the basis of the at least one vocabulary item when the validation data element in the second signal confirms that the data indicative of at least one vocabulary item is a match to the spoken utterance;
   c) a communication link interface operative to maintain a wireless communication link with a follower controller in a locomotive, said communication link interface being operative to transmit the control signal indicative of a command to be executed by the locomotive to the follower controller over the communication link.

2. A lead controller as defined in claim 1, wherein the second signal indicative of a validation data element is derived from a spoken utterance.

3. A lead controller as defined in claim 1, wherein said processing unit includes a speech recognition engine to generate data indicative to the at least one vocabulary item that is a potential match to the spoken utterance.

4. A lead controller as defined in claim 3, wherein the indicative of the at least one vocabulary item is an orthographic representation of the at least one vocabulary item.

5. A lead controller as defined in claim 3, wherein said processing unit includes a speech recognition dictionary including a plurality of vocabulary items, said speech recognition engine being coupled to said speech recognition dictionary and being operative to select amongst the plurality of vocabulary items at least one vocabulary item as being a potential match to the spoken utterance.

6. A lead controller as defined in claim 5, wherein said processing unit is operative to communicate to a human operator the at least one vocabulary item.

7. A lead controller as defined in claim 6, wherein said processing unit is operative to audibly communicate to the human operator the at least one vocabulary item.

8. A lead controller as defined in claim 7, wherein said processing unit is operative to generate a signal conveying the at least one vocabulary item in synthetic speech form.

9. A lead controller as defined in claim 8, wherein said processing unit includes a text-to-speech converter including an input coupled to said speech recognition dictionary for receiving the at least one vocabulary item, said text-to-speech converter having an output for generating the signal conveying the at least one vocabulary item in synthetic speech form.

10. A lead controller as defined in claim 6, wherein said processing unit includes a command validation unit.

11. A lead controller as defined in claim 10, wherein said command validation unit is operative to confirm on the basis of the data validation element that the data indicative of the at least one vocabulary item is a match to the spoken utterance.

12. A lead controller as defined in claim 11, wherein said command validation unit includes an output for releasing the data indicative of the at least one vocabulary item when the at least one vocabulary item has been confirmed as being a match to the spoken utterance.

13. A lead controller as defined in claim 12, wherein said processing unit includes a command encoder coupled to the output of said command validation unit, said command encoder being operative to:
   a) encode the data indicative of the at least one vocabulary unit that has been confirmed as being a match to the spoken utterance; and
   b) generate an encoded command signal.

14. A lead controller as defined in claim 13, wherein said processing unit includes a control unit including an input for receiving the encoded command signal, said control unit being operative to generate in response to the encoded command signal the control signal indicative of a command to be executed by the locomotive.

15. A lead controller as defined in claim 1, wherein said processing unit includes a speaker verification module, said speaker verification module being operative to process the first signal to generate speaker confirmation data indicative of whether the spoken utterance belongs to an authorized user, said processing unit being operative to generate the control signal indicative of the command to be executed by the locomotive when the validation data element in the second signal confirms that the data indicative of at least one vocabulary item is a match to the spoken utterance and when the speaker confirmation data confirms that the spoken utterance belongs to an authorized user.

16. A remote control system for a locomotive, comprising:
   a) a lead controller remote from the locomotive;
   b) a follower controller;
   c) said lead controller and said follower controller being operative to establish a wireless communication link therebetween for transporting data from one of said controllers to the other of said controllers;
   d) said lead controller including:
      i) an input for receiving:
         I) a first signal derived from a spoken utterance; and
         II) a second signal indicative of a validation data element;
      ii) a processing unit coupled to said input, said processing unit being operative to:
         I) process the first signal to derive data indicative of at least one vocabulary item that is a potential match to the spoken utterance;
         II) generates a control signal indicative of a command to be executed by the locomotive at least in part on the basis of the at least one vocabulary item when the second signal confirms that the data indicative of at least one vocabulary item is a match to the spoken utterance;
      iii) a communication link interface operative to transmit the data indicative of a command to be executed by the locomotive over the wireless communication link to said follower controller;
   e) said follower controller being responsive to the data indicative of the command to be executed by the locomotive received over the wireless communication link for generating local signals for application to the locomotive to cause the locomotive to execute the command.

17. A remote control system for a locomotive as defined in claim 16, wherein the second signal indicative of a validation data element is derived from a spoken utterance.

18. A remote control system for locomotive as defined in claim 16, wherein said processing unit includes a speech recognition engine to generate data indicative of at least one vocabulary item that is a potential match to the spoken utterance.

19. A remote control system for a locomotive as defined in claim 18, wherein the data indicative of the at least one vocabulary item is an orthographic representation of the at least one vocabulary item.

20. A remote control system for a locomotive as defined in claim 18, wherein said processing unit includes a speech recognition dictionary including a plurality of vocabulary items, said speech recognition engine being coupled to said speech recognition dictionary and being operative to select from amongst the plurality of vocabulary items at least one vocabulary item that is a potential match to the spoken utterance.

21. A remote control system for a locomotive as defined in claim 20, wherein said processing unit is operative to communicate to a human operator the at least one vocabulary item selected by the speech recognition engine as being a potential match to the spoken utterance.

22. A remote control system for a locomotive as defined in claim 21, wherein said processing unit is operative to audibly communicate to the human operator the at least one vocabulary item.

23. A remote control system for a locomotive as defined in claim 22, wherein said processing unit is operative to generate a signal conveying the at least one vocabulary item in synthetic speech form.

24. A remote control system for a locomotive as defined in claim 23, wherein said processing unit includes a text-to-speech converter including an input coupled to said speech recognition dictionary for receiving the at least one vocabulary item, said text-to-speech converter having an output for generating the signal conveying the at least one vocabulary item in synthetic speech form.

25. A remote control system for a locomotive as defined in claim 22, wherein said processing unit includes a command validation unit.

26. A remote control system for a locomotive as defined in claim 25, wherein said command validation unit is operative to confirm on the basis of the data validation element that the data indicative of the at least one vocabulary item is a match to the spoken utterance.

27. A remote control system for a locomotive as defined in claim 26, wherein said command validation unit includes an output for releasing the data indicative of the at least one vocabulary item when the at least one vocabulary item has been confirmed as being a match to the spoken utterance.

28. A remote control system for a locomotive as defined in claim 27, wherein said processing unit includes a command encoder coupled to the output of said command validation unit, said command encoder being operative to:
   a) encode the data indicative of the at least one vocabulary unit that has been confirmed as being a match to the spoken utterance; and
   b) generate an encoded command signal.

29. A remote control system for a locomotive as defined in claim 28, wherein said processing unit includes a control unit including an input for receiving the encoded command signal and for generating in response to the encoded command signal the control signal indicative of the command to be executed by the locomotive.

30. A lead controller for a locomotive, comprising:
   a) input means for receiving:
      i) a first signal derived from a spoken utterance; and
      ii) a second signal indicative of a validation data element;
   b) processing means coupled to said input means, said processing means being operative to:
      i) process the first signal to derive data indicative of at least one vocabulary item that is a potential match to the spoken utterance;
      ii) generate a signal indicative of a command to be executed by the locomotive at least in part on the basis of the at least one vocabulary item when the second signal confirms that the data indicative of at least one vocabulary item is a match to the spoken utterance;
   c) communication link interface means operative to maintain a wireless communications link means with a follower controller means in a locomotive means, said communication link interface means being operative to transmit the data indicative of a command to be executed by the locomotive to the follower controller means over the wireless communication link means.

31. A method for remotely controlling a locomotive, said method comprising:
   a) receiving a first signal derived from a spoken utterance;
   b) processing the first signal to derive data indicative of at least one vocabulary item that is a potential match to the spoken utterance;
   c) communicating to a human operator the at least one vocabulary item;
   d) receiving a second signal indicative of a validation data element;
   e) processing the data indicative of the at least one vocabulary item to generate a signal indicative of a command to be executed by the locomotive;
   f) transmitting the signal indicative of a command to be executed by the locomotive when the second signal confirms that the data indicative of at least one vocabulary item is a match to the spoken utterance.

32. A method as defined in claim 31, wherein the second signal indicative of a validation data element is derived from a spoken utterance.

33. A method as defined in claim 31, said method comprising audibly communicating to the human operator the at least one vocabulary item.

34. A method as defined in claim 33, said method comprising generating a signal conveying the at least one vocabulary item in synthetic speech form.

35. A method as defined in claim 31, wherein said method comprises:
   a) processing the first signal to generate speaker confirmation data indicative of whether the spoken utterance belongs to an authorized user;
   b) generating the control signal indicative of the command to be executed by the locomotive when the validation data element in the second signal confirms that the data indicative of at least one vocabulary item is a match to the spoken utterance and when the speaker confirmation data confirms that the spoken utterance belongs to an authorized user.

* * * * *

UNITED STATES PATENT AND TRADEMARK OFFICE
CERTIFICATE OF CORRECTION

PATENT NO.     : 6,466,847 B1
DATED          : October 15, 2002
INVENTOR(S)    : Horst It is certified that error appears in the above-identified patent and that said Letters Patent is hereby corrected as shown below:

Column 6,
Line 39, "ii) a second indicative" should read -- ii) a second signal indicative --
Lines 65-66, "wherein the indicative" should read -- wherein the data indicative --

Column 8,
Line 14, "II) generates" should read -- II) generate --

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,466,847 B1
DATED : October 15, 2002
INVENTOR(S) : Horst

It is certified that error appears in the above-identified patent and that said Letters Patent is hereby corrected as shown below:

<u>Title page,</u>
Insert item -- [73] Assignee: Canac Inc., St. Laurent, Quebec (Canada) --

Signed and Sealed this

Twenty-eighth Day of October, 2003

JAMES E. ROGAN
*Director of the United States Patent and Trademark Office*